(12) United States Patent
Kim

(10) Patent No.: US 8,200,942 B2
(45) Date of Patent: Jun. 12, 2012

(54) HYBRID MULTIFUNCTION COMPONENT SYSTEM WITH COMPONENT INTERFACE ENCAPSULATION INCLUDING OS PACKET TRANSLATOR FOR COMMUNICATION OVER UNIFIED DATA BUS ARCHITECTURE

(76) Inventor: Moon J. Kim, Wappingers Falls, NY (US)

( * ) Notice: Subject to any disclaimer, the term of this patent is extended or adjusted under 35 U.S.C. 154(b) by 459 days.

(21) Appl. No.: 12/496,776

(22) Filed: Jul. 2, 2009

(65) Prior Publication Data
US 2010/0325392 A1 Dec. 23, 2010

Related U.S. Application Data

(60) Provisional application No. 61/218,569, filed on Jun. 19, 2009.

(51) Int. Cl.
*G06F 15/16* (2006.01)

(52) U.S. Cl. .............................................. 712/32; 712/29
(58) Field of Classification Search .................. None
See application file for complete search history.

(56) References Cited

U.S. PATENT DOCUMENTS
2009/0231112 A1* 9/2009 Baalbergen et al. ..... 340/286.02
* cited by examiner

*Primary Examiner* — Kenneth Kim

(57) ABSTRACT

This invention describes an apparatus, architecture, method, operating system, data network, and application program products for a hybrid digital system with multiple heterogeneous components. This invention is applied to a multiple generic microprocessor architecture s with a set (e.g., one or more cores) of controlling components and a set of groups of sub-processing components. Under this arrangement, different technology cores and functional components, such as memory, are organized in a way that different technologies can collaborate as a system.

20 Claims, 14 Drawing Sheets

HYBRID MULTIFUNCTION COMPONENT SYSTEM WITH COMPONENT INTERFACE ENCAPSULATION INCLUDING OS PACKET TRANSLATOR FOR COMMUNICATION OVER UNIFIED DATA BUS ARCHITECTURE

CROSS-REFERENCE TO RELATED APPLICATION

This application claims the benefit of provisional patent application No. 61/218,569 entitled "Hybrid Multi Function Component System", filed Jun. 19, 2009, the entire contents of which are herein incorporated by reference.

FIELD OF THE INVENTION

This invention is related to the hybrid digital computing system for enabling heterogeneous technology multiple-digital components in the system.

BACKGROUND OF THE INVENTION

Multi-Core Processor (MCP) has been applied to a system to perform a specific function in an application. The characteristics of each core's technology are different and therefore it does not work well when two or more cores are mixed. This is a major drawback of MCP. The design inflexibility forces continuous use of one technology. For an example, in a symmetric MCP, there can be a Main Processing Element (MPE) and N Synergetic Processor Elements (SPE). In addition, each hybrid design requires customized integration of different component technologies. This is time-consuming, and is subject to design error and mistakes. Moreover, ever-increasing interconnect complexity prevents design scalability. Still yet, different technology components still present compatibility and efficiency problems.

In view of the foregoing, there exists a need for a solution that solves one core technology deficiencies of the existing art.

SUMMARY OF THE INVENTION

This invention describes an apparatus, architecture, method, operating system, data network, and application program products for a hybrid digital system with multiple heterogeneous components. This invention is applied to a multiple generic microprocessor architecture s with a set (e.g., one or more cores) of controlling components and a set of groups of sub-processing components. Under this arrangement, different technology cores and functional components, such as memory, are organized in a way that different technologies can collaborate as a system.

A first aspect of the present invention provides a hybrid multi-function component system, comprising: an operating system wrapper wrapping an operating system; a component wrapping the operating system wrapper; a unified data bus architecture having a data bus routing island, the unified data bus architecture being coupled to a data bus packet translator; an operating system packet translator coupled to the data bus packet translator and the operating system wrapper; and a component interface encapsulation encapsulating the operating system wrapper and the operating system packet translator.

A second aspect of the present invention provides a method for forming a hybrid multi-function component system, comprising: wrapping an operating system with an operating system wrapper wrapping; providing a unified data bus architecture having a data bus routing island; coupling the unified data bus architecture being to a data bus packet translator; coupling an operating system packet translator to the data bus packet translator and the operating system wrapper; and encapsulating the operating system wrapper and the operating system packet translator with a component interface encapsulation thereby forming the hybrid multi-function component system.

A third aspect of the present invention provides a method for deploying a hybrid multi-function component system, comprising: providing a computer infrastructure being operable to: wrap an operating system with an operating system wrapper wrapping; provide a unified data bus architecture having a data bus routing island; couple the unified data bus architecture being to a data bus packet translator; couple an operating system packet translator to the data bus packet translator and the operating system wrapper; and encapsulate the operating system wrapper and the operating system packet translator with a component interface encapsulation thereby forming the hybrid multi-function component system.

A fourth aspect of the present invention provides a data processing system for comprising: a memory medium comprising instructions; a bus coupled to the memory medium; and a processor coupled to the bus that when executing the instructions causes the data processing system to: wrap an operating system with an operating system wrapper wrapping; provide a unified data bus architecture having a data bus routing island; couple the unified data bus architecture being to a data bus packet translator; couple an operating system packet translator to the data bus packet translator and the operating system wrapper; and encapsulate the operating system wrapper and the operating system packet translator with a component interface encapsulation thereby forming the hybrid multi-function component system.

BRIEF DESCRIPTION OF THE DRAWINGS

These and other features of this invention will be more readily understood from the following detailed description of the various aspects of the invention taken in conjunction with the accompanying drawings in which.

FIGS. A-C 10 depict method flow diagrams according to the present invention.

Figure 11:
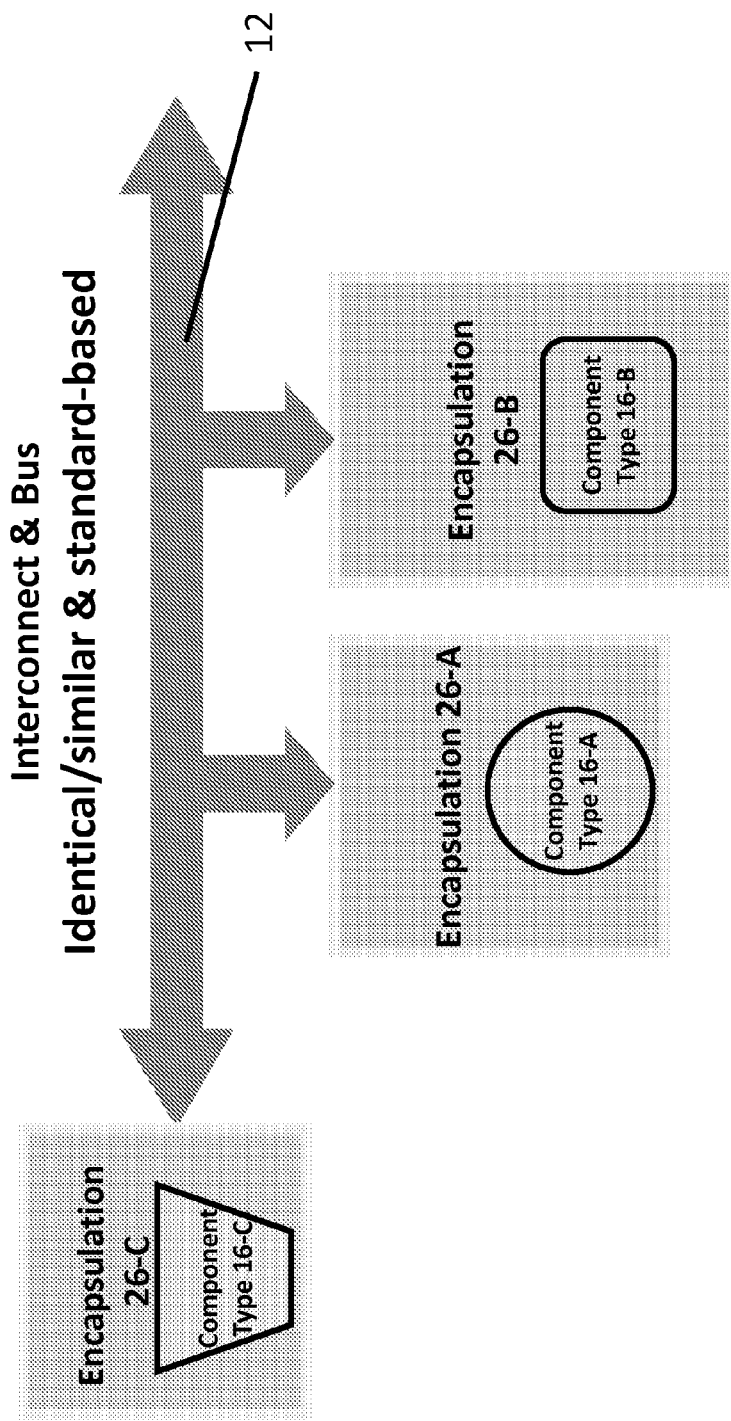

FIG. 11 depicts one implementation according to the present invention.

Figure 12:
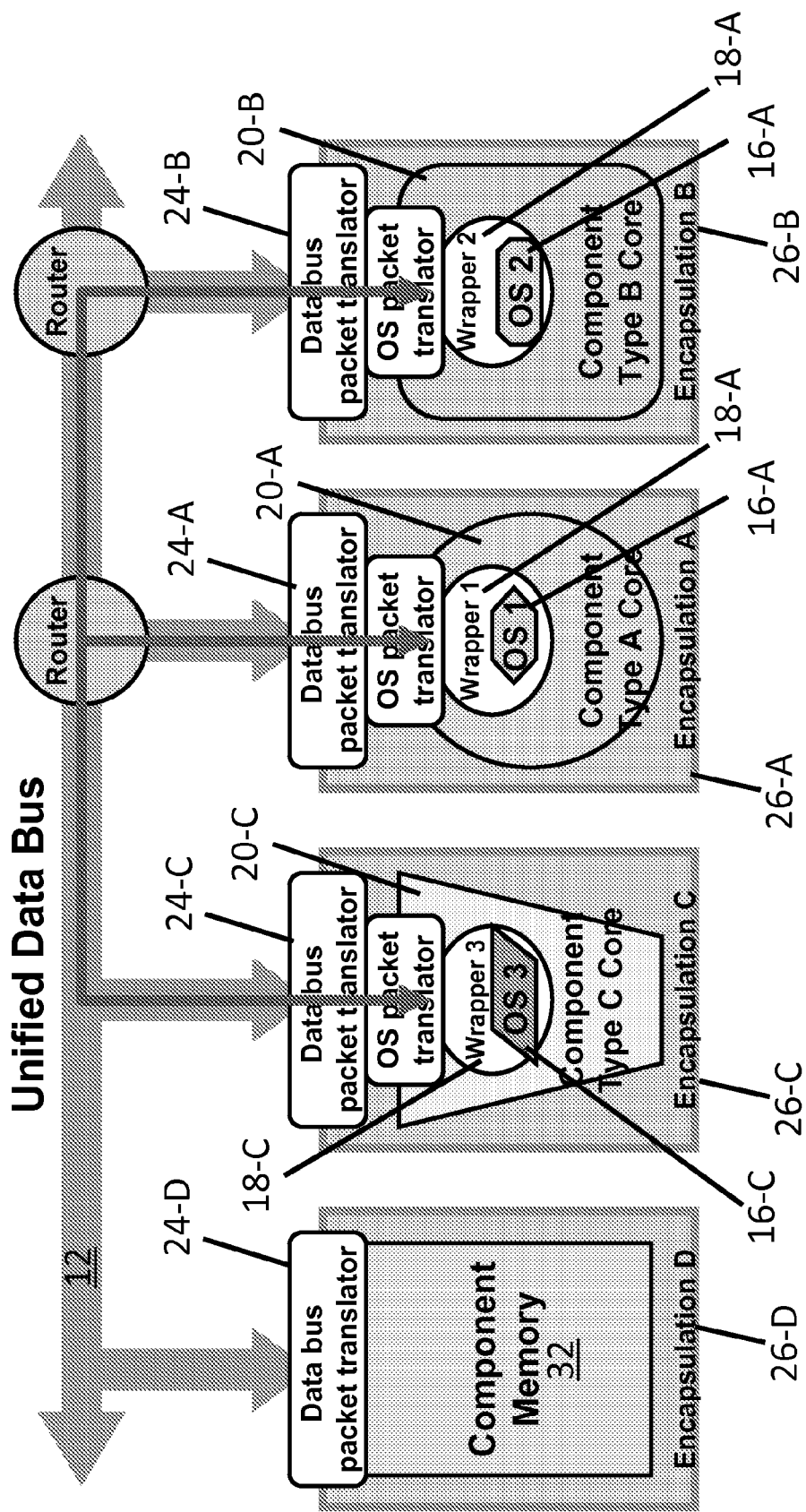

FIG. 12 depicts another implementation according to the present invention.

Figure 13:
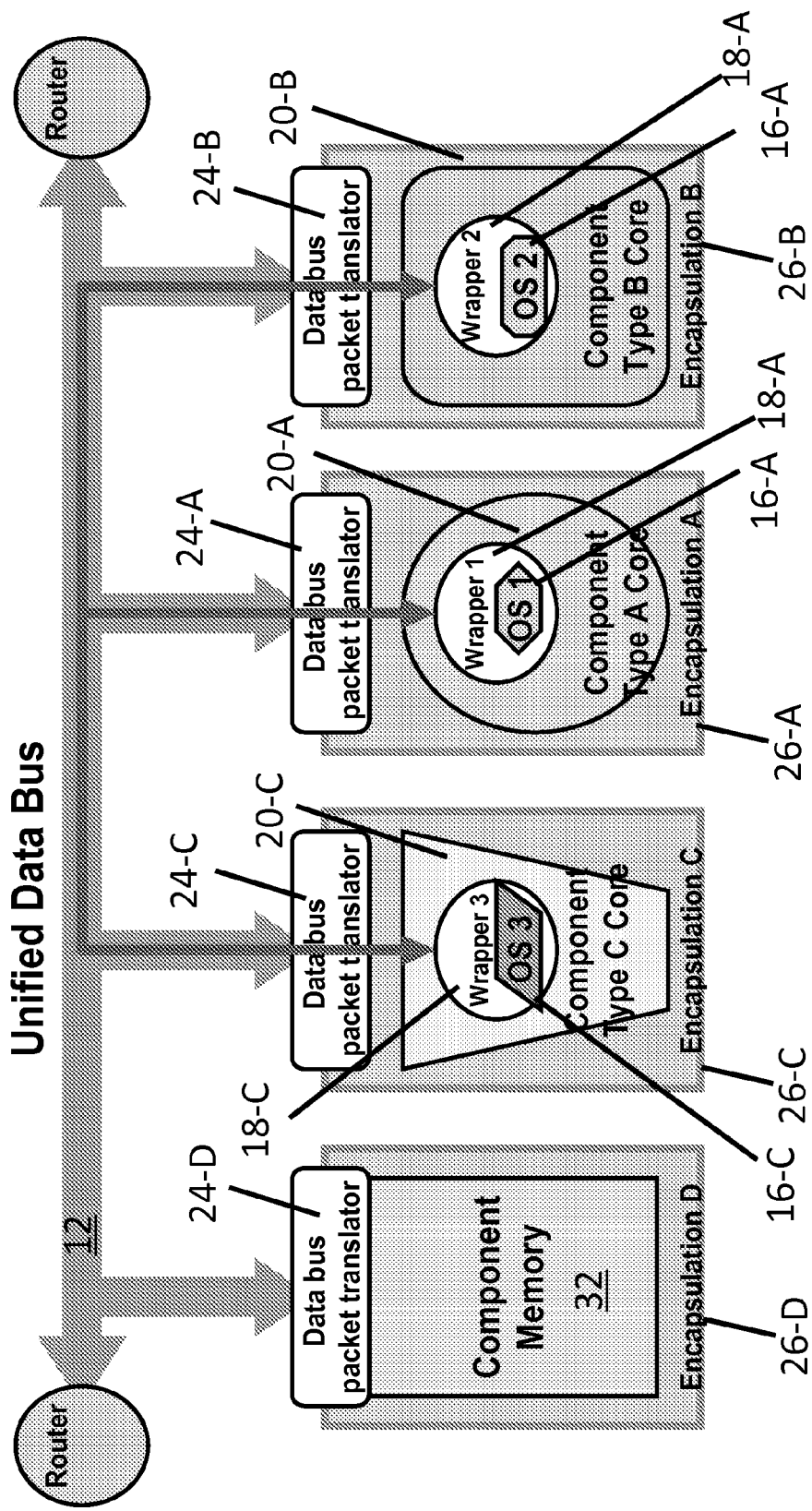

FIG. 13 depicts another implementation according to the present invention.

Figure 14:
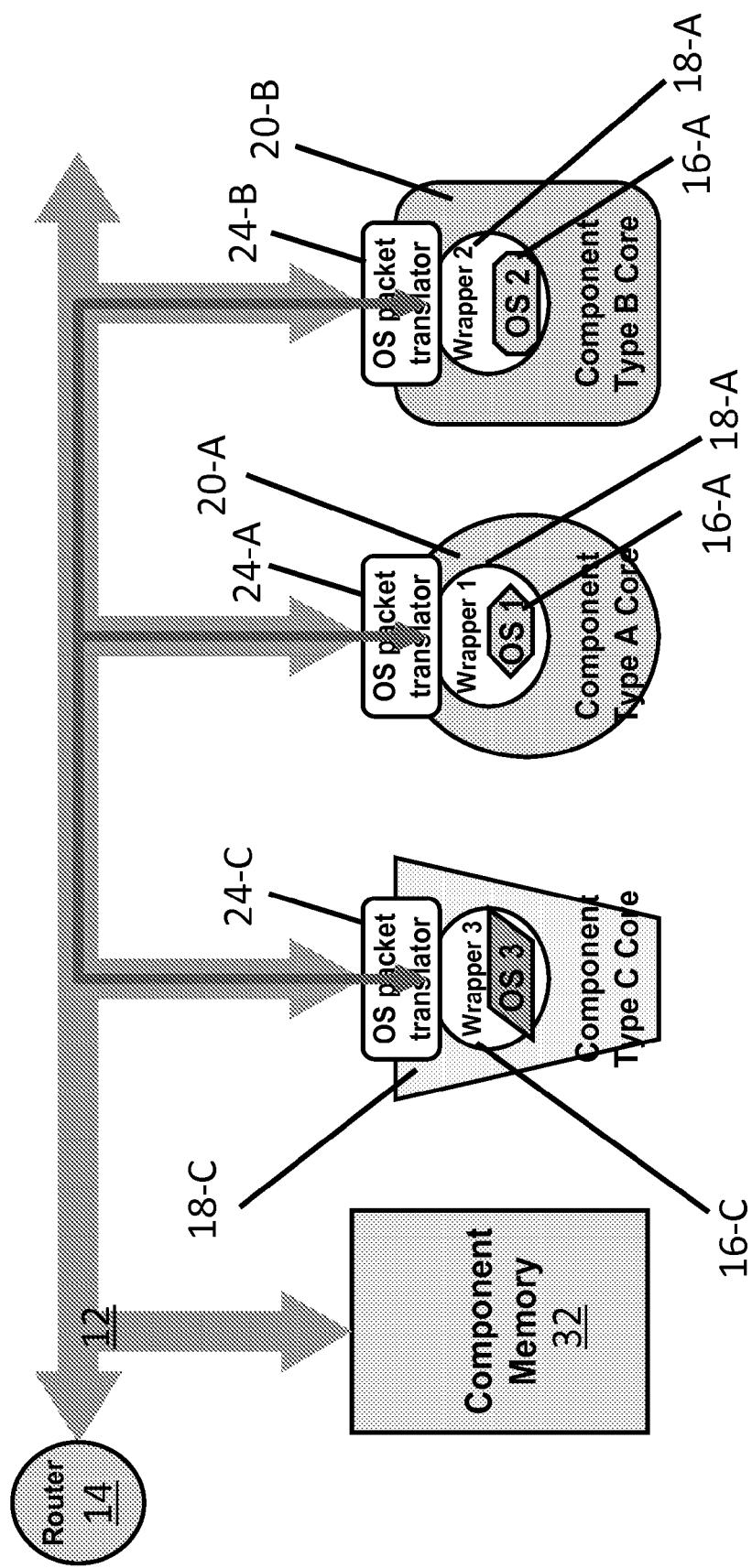

FIG. 14 depicts another implementation according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

For convenience, the Detailed Description of the Invention has the following sections:
I. General Description
II. Examples/Implementations
III. Computerized Implementations I. General Description As indicated above, this invention describes an apparatus, architecture, method, operating system, data network, and application program products for a hybrid digital system with multiple heterogeneous components. This invention is applied to a multiple generic microprocessor architecture s with a set (e.g., one or more cores) of controlling components and a set of groups of sub-processing components. Under this arrangement, different technology cores and functional components, such as memory, are organized in a way that different technologies can collaborate as a system.

Figure 1:
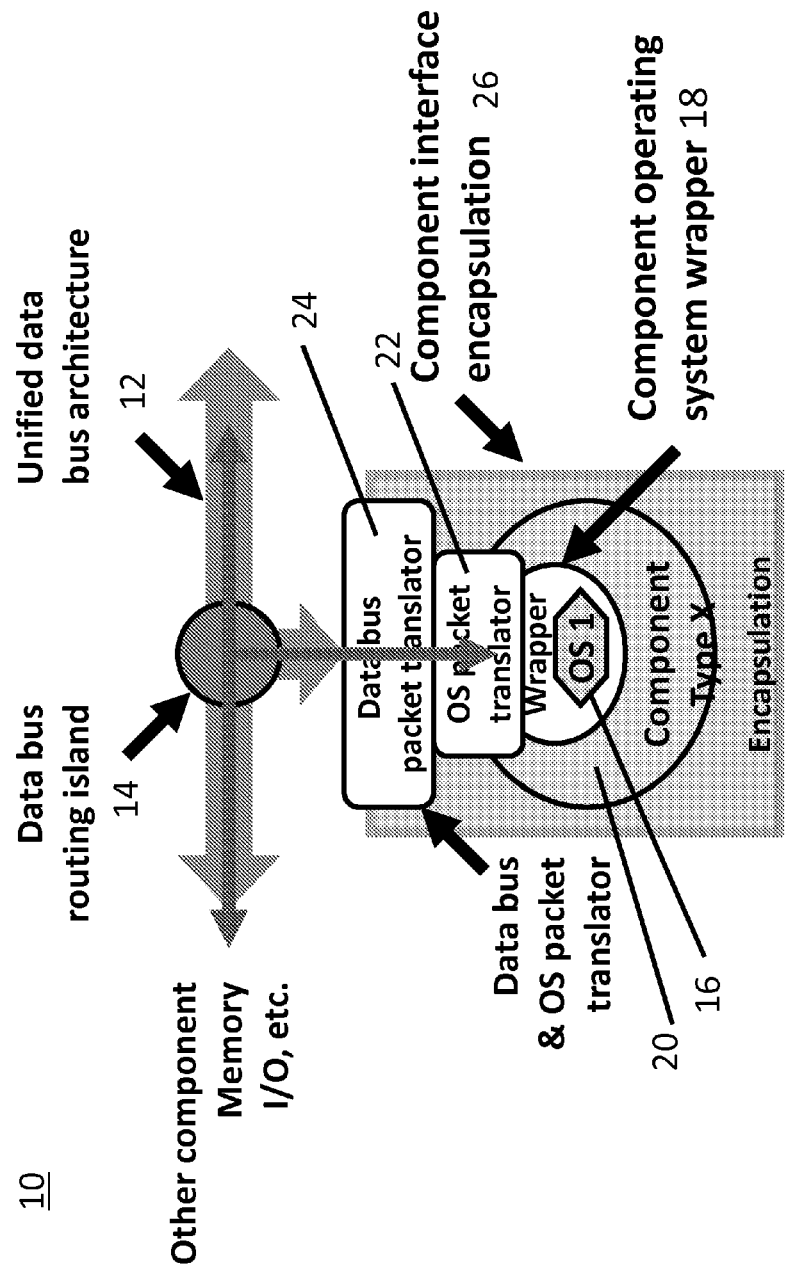
FIG. 1 depicts a hybrid multi-function component system according to the present invention.

The invention proposes additional layers separate system integration levels. In addition, the present invention is independent of technology, IP, and platform is realized, and/or is transparent for different application. Moreover, the present invention provides for (a): multiple manufacturing sources; scalable performance; redundancy and yield; reusability; platform continuity; stable product roadmap; and/or reduced time-to-market Referring now to FIG. 1, a hybrid multi-function component system (hereinafter HMFC system 10) according to the present invention is shown. As depicted, HMFC system 10 comprises: a unified data bus architecture 12, data bus routing island 14, an operating system 16, an operating system wrapper 18, a component 20 wrapping operating system wrapper 18 and operating system 16, an operating system packet translator 22, a data bus packet translator 24 coupled to operating system wrapper 18 and unified data bus architecture 12 via data bus routing island 14, and a component interface encapsulation encapsulating component 20, operating system wrapper 18, and operating system 16.

Figure 2:
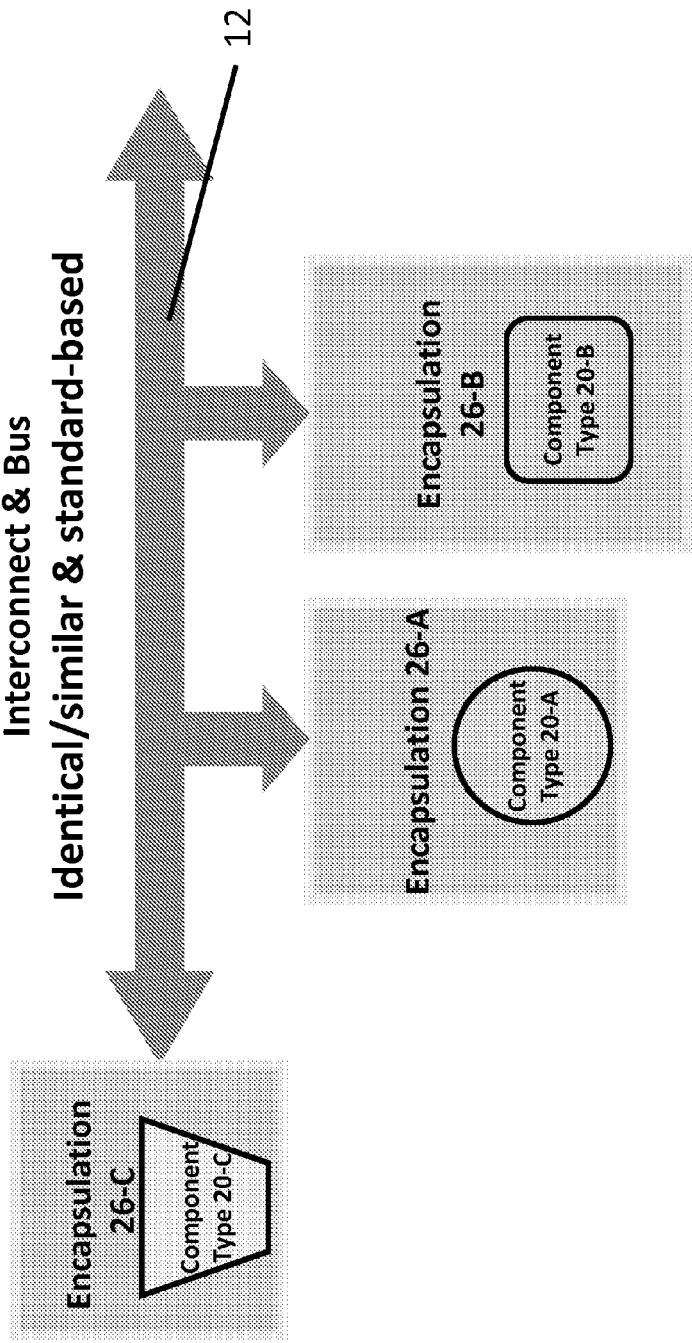
FIG. 2 depicts a component interface encapsulation according to the present invention.
Figure 3:
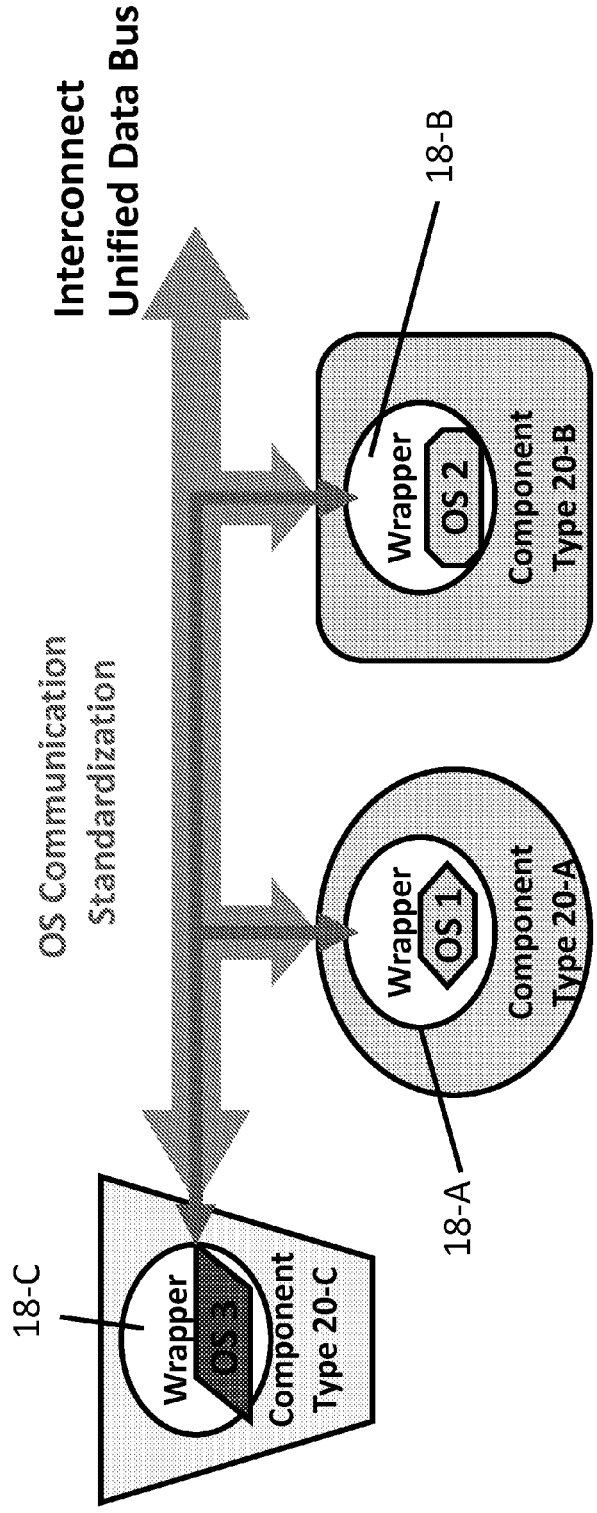
FIG. 3 depicts an operating system wrapper according to the present invention.

It should be understood that the terms operating system operating system means operational algorithm and system. This includes firmware and hard-wired algorithms, such as cache memory. Abbreviations of the terms "operating system' can include (among others): O/S, OS, etc. Data bus or unified data bus architecture refers to any communication method such as a high-speed serial channel. Some of the functions of these components are further summarized below:

Component encapsulation (hardware)
    Make core component similar/same/uniform to the external entity
        Memory, I/O, component computation load, clock speed, power consumption, cache level
    Operating system wrapper (software)
        O/S-level component operation wrapper
        Component control, report, sharing, collaboration
    Unified data bus architecture and protocol (hardware)
        Cache access, memory access, DMA, component-to-component communication, main-component-to-sub-component control/program loading/result transfer
    Data bus packet wrapper (hardware+software)
        I/O requests are translated for unified data bus transport
        For all I/O of an component
    Data bus routing island (hardware)
        Separates & controls data bus for efficient communication
        Broadcast, sequential/non-sequential routing, burst mode, sniffing Referring to FIG. 2, use of component interface encapsulation 26 is shown in greater detail. As depicted component types 20A-C are encapsulated within comment interface encapsulations 26A-C, which themselves communicate via unified data bus architecture 12. Some of the functions of these components are further summarized below:

Component encapsulating wrapper provides standard-based hardware interconnect and power grid
    All I/O's are wrapped
    Different components need different wrappers
    All components looks very similar with wrapper from outside
    Compliant to the standard interconnect and bus
Standard-based high-speed interconnect
    Unified data bus architecture
    Data bus routing island
    Data bus packet wrapper, etc.
Divide-and-conquer for components and interconnects
Reduce component interface integration time
Ensure component interface compatibility Referring now to FIG. 3, use of component operating system wrapper 18 is shown in greater detail. As depicted, component operating system wrappers 18A-C wrap operating systems 16A-C of component types 20A-C, which themselves communicate via unified data bus architecture 12. Some of the functions of these components are further summarized below:

Component O/S wrapper provides standard-based software interfaces
    Program loading, control, load balancing, component O/S status
    Each component hosts different O/S types, e.g. AIX, Linux, Windows
Different component runs different cores O/S (even minimal such as cache block)
O/S collaboration is customized for each HCMCP
Each Core O/S type adopts standard-based control & communication protocol
Each Core O/S needs information wrapper as a software & O/S interface
Information includes component clock speed, utilization, component manufacturing yield/defect, cache configuration, I/O throughput (& requirement), load balancing, exception, interrupt, etc.

Figures 4A, 4B:
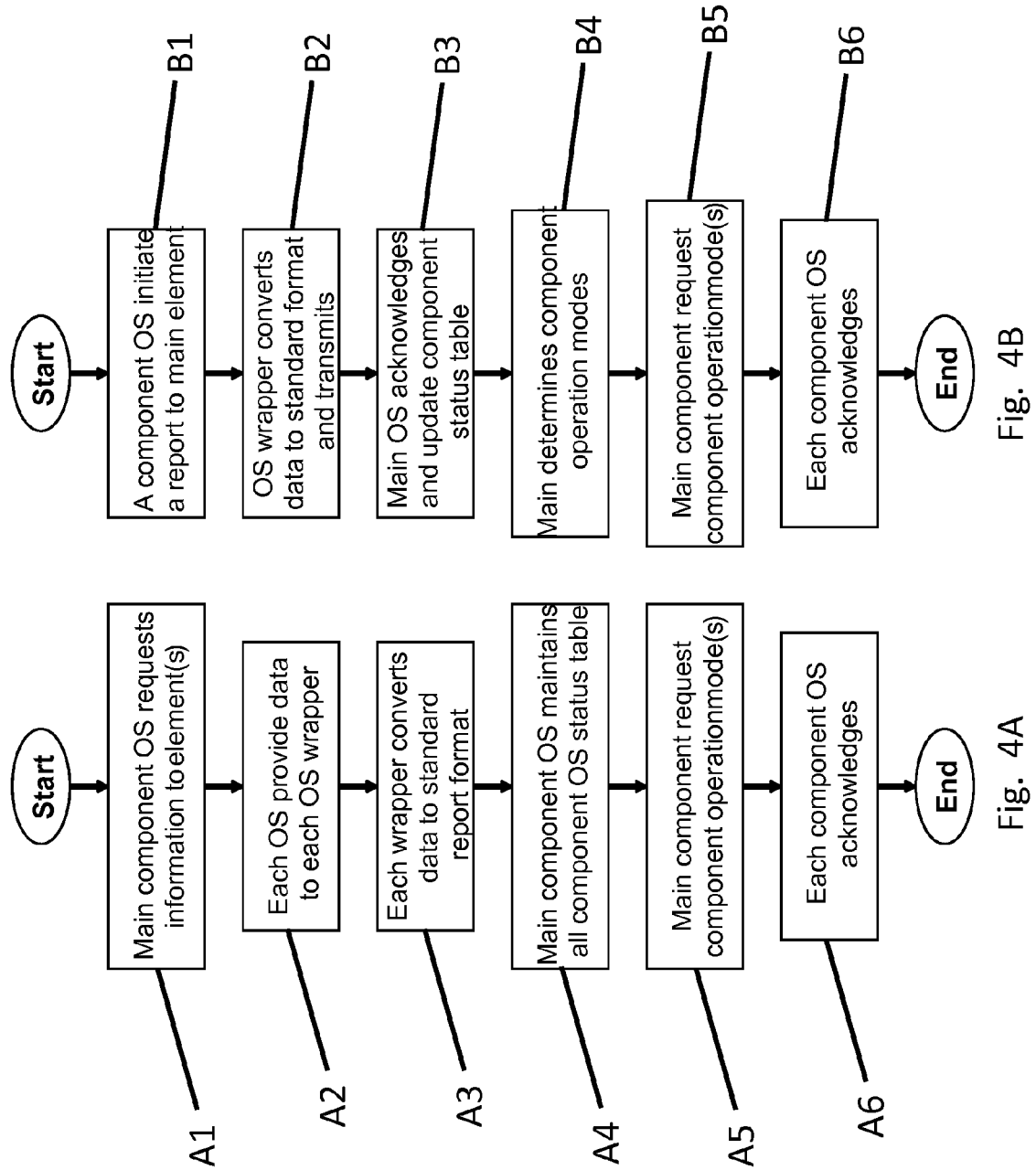
FIGS. 4A-B depict method flow diagrams according to the present invention.

Referring now to FIGS. 4A-B, two method flow diagrams are depicted. In FIG. 4A, the steps are as follows: In step A1, main component O/S requests information to element(s). In step A2, each O/S provides data to each O/S wrapper. In step A3, each wrapper converts data to standard report format. In step A4, main component O/S maintains all component O/S status table. In step A5, main component request component operation mode(s). In step A6, each component O/S acknowledges the request(s).

In FIG. 4B, the steps are as follows: In step B1, a component O/S initiates a report to main element. In step B2, the O/S wrapper converts data to standard format and transmits the same. In step B3, the main O/S acknowledges the transmission and updates component status table. In step B4, the main O/S determines component operation modes. In step B5, the main component requests component operation mode(s). In step B6, each component O/S acknowledges their respective requests.

Figure 5:
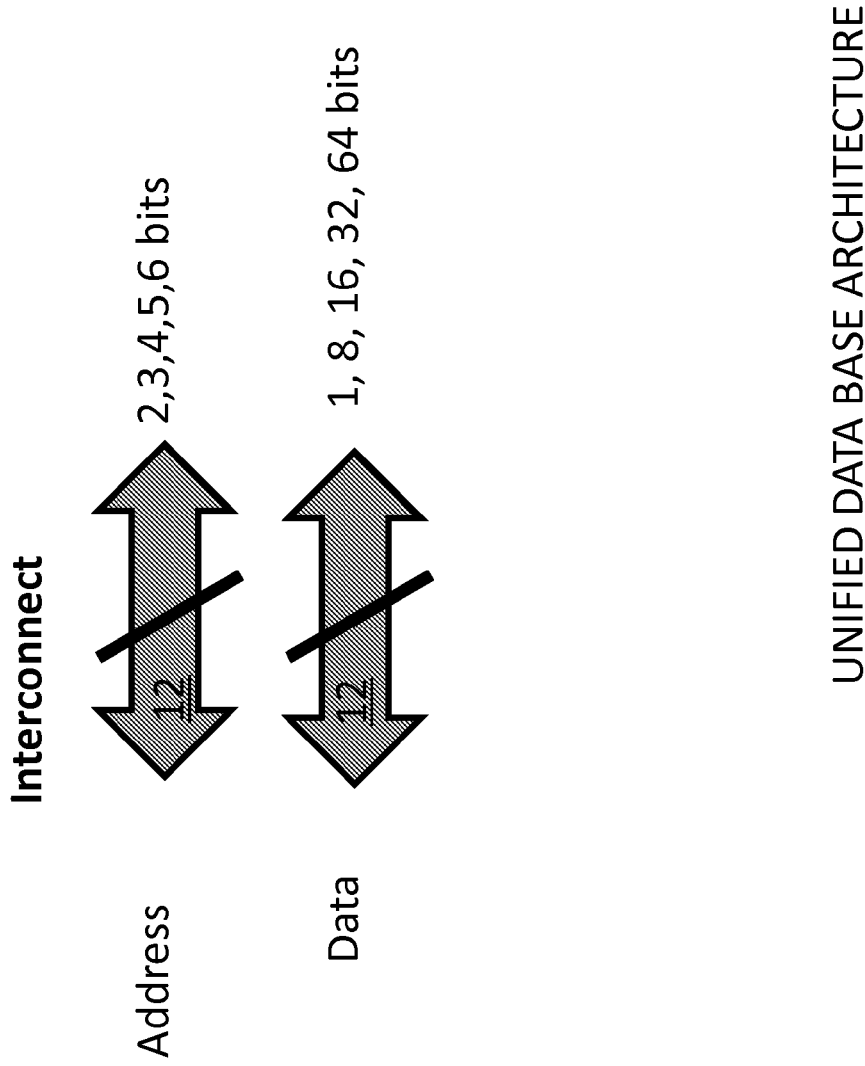
FIG. 5 depicts a unified data base architecture according to the present invention.
Figure 6:
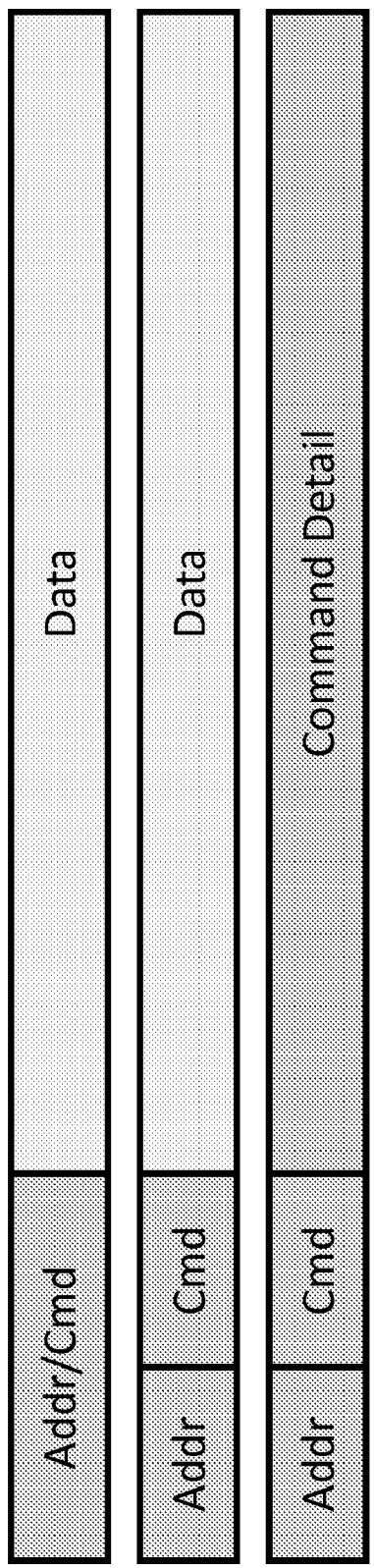
FIG. 6 depicts a data bus packet translator according to the present invention.
Figure 7:
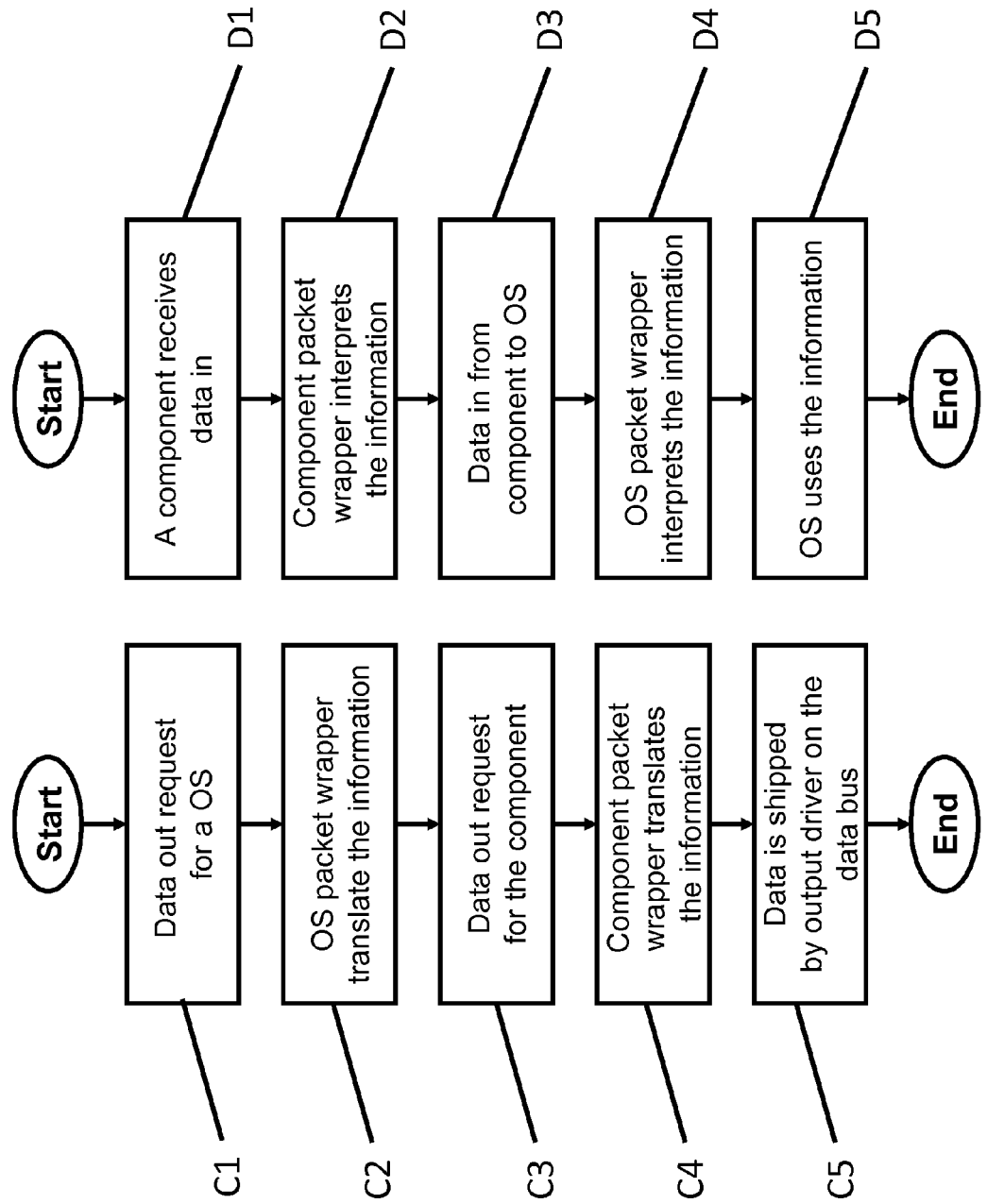
FIGS. 7A-B depict method flow diagrams according to the present invention.

Referring now to FIG. 5, a diagram of unified data bus architecture 12 is shown. As depicted, unified data bus architecture can include both address blocks comprising anywhere from 2-6 bits as well as data blocks comprising 1, 8, 16, 32, or 64 bits. Some of the functions of unified data bus architecture 12 are summarized below:

All component I/O's are deployed to the unified bus
Multiple bus for wider bandwidth
Scalable bus architecture standard
Data bus architecture standardization
  Field
    Address & Data
      Dedicated address bus
    Address+Data
      1 bit address & command line Referring now to FIG. 6, a diagram of data bus translator 24 is shown. As depicted, data bus translator 24 is capable of receiving, translating, and transmitting all types of I/O data (e.g., address, command, and supporting data, as well as command details). Some of the functions of unified data bus architecture 12 are summarized below:

All I/O data is translated for unified data bus architecture
Address+Command field for translation information
A command code is assigned
Sequential/non-sequential data transport
Hardware-level wrapping
  DMA, Cache, I/O
Software-level (double) wrapping
  I/O, component
Broadcast packet
Priority code for interrupt and exception Referring now to FIGS. 7A-B, two additional method flow diagrams are depicted. As first shown in FIG. 7A, in step C1, a data out request for an OS is sent. In step C2, OS packet wrapper translates the information. In step C3, a data out request is sent for a component. In step C4, the component packet wrapper translates the information. In step C5, data is shipped by output driver on the data bus.

Referring to FIG. 7B, in step D1, a component receives data. In step D2, the component packet wrapper interprets the data. In step D3, data is sent from the component to the OS. In step D4, the OS packet wrapper interprets the data. In step D5, the OS uses the interpreted data.

Figure 8:
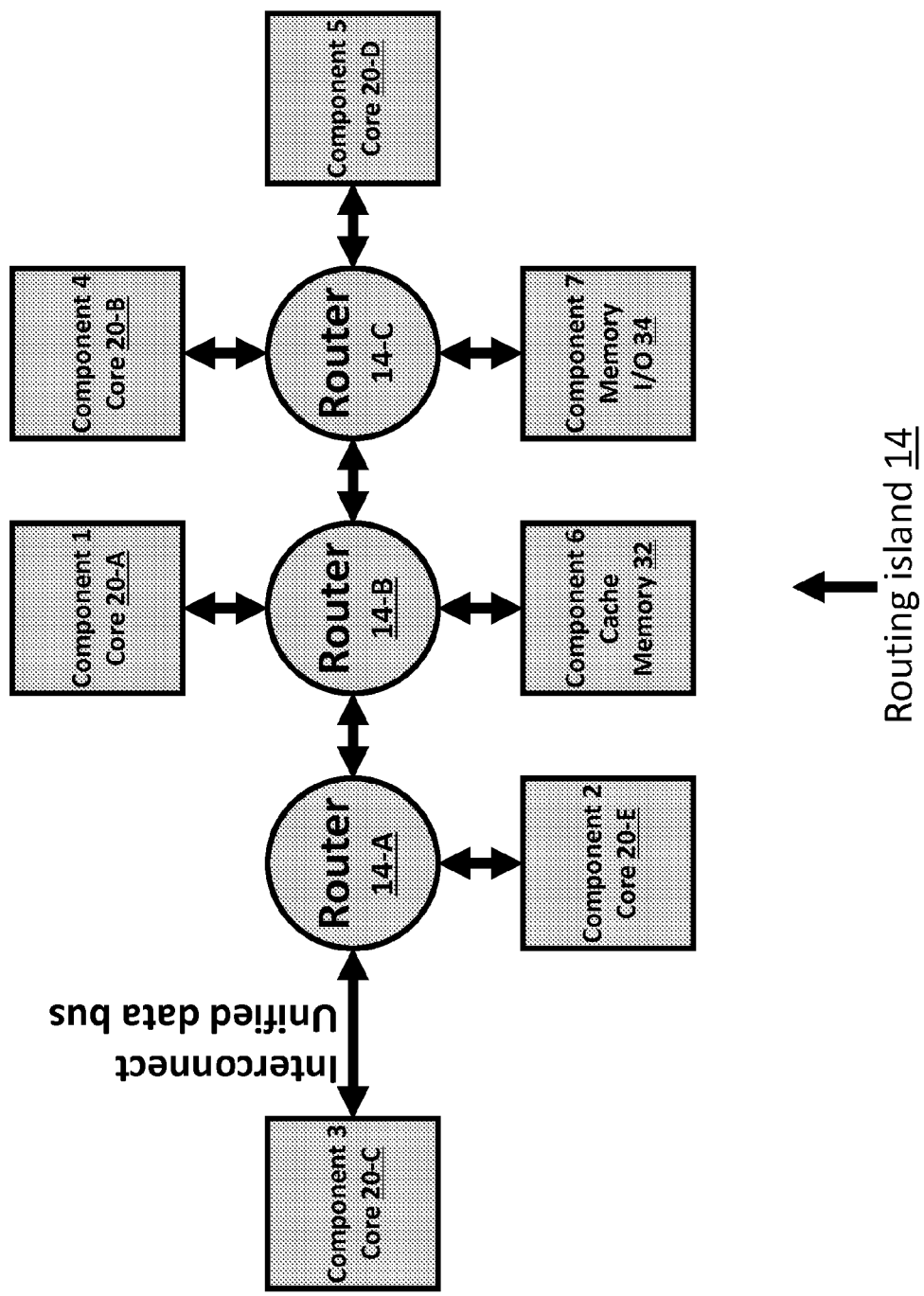
FIG. 8 depicts a data bus routing island according to the present invention.
Figure 9:
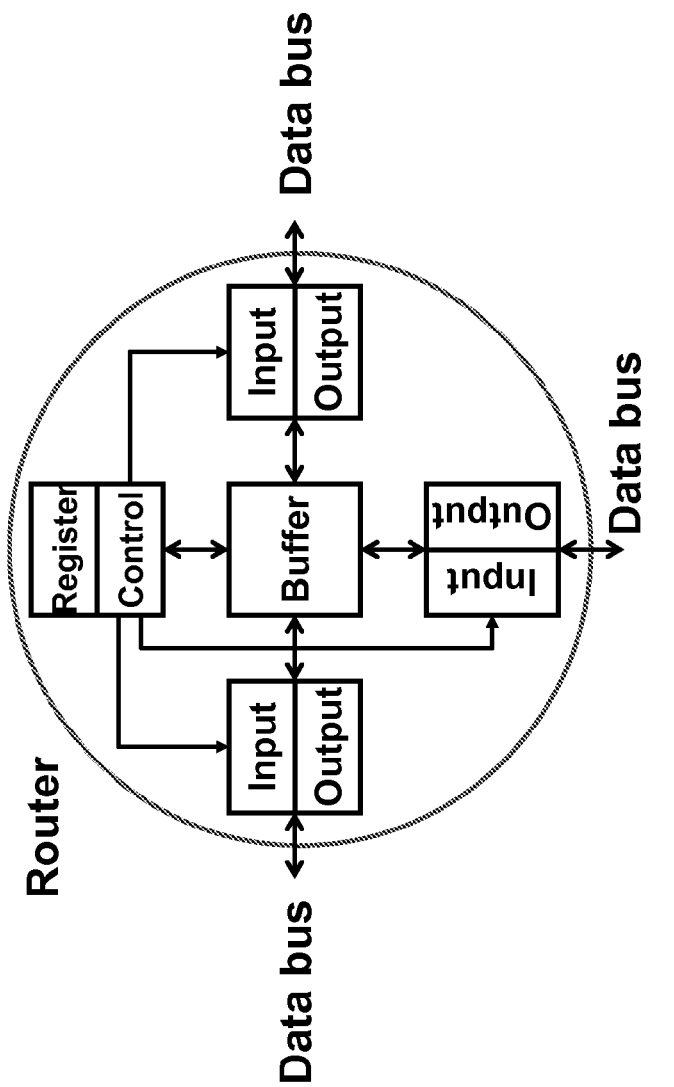
FIG. 9 depicts another view of the data bus routing of FIG. 8 according to the present invention.
Figures 10A, 10B, 10C:
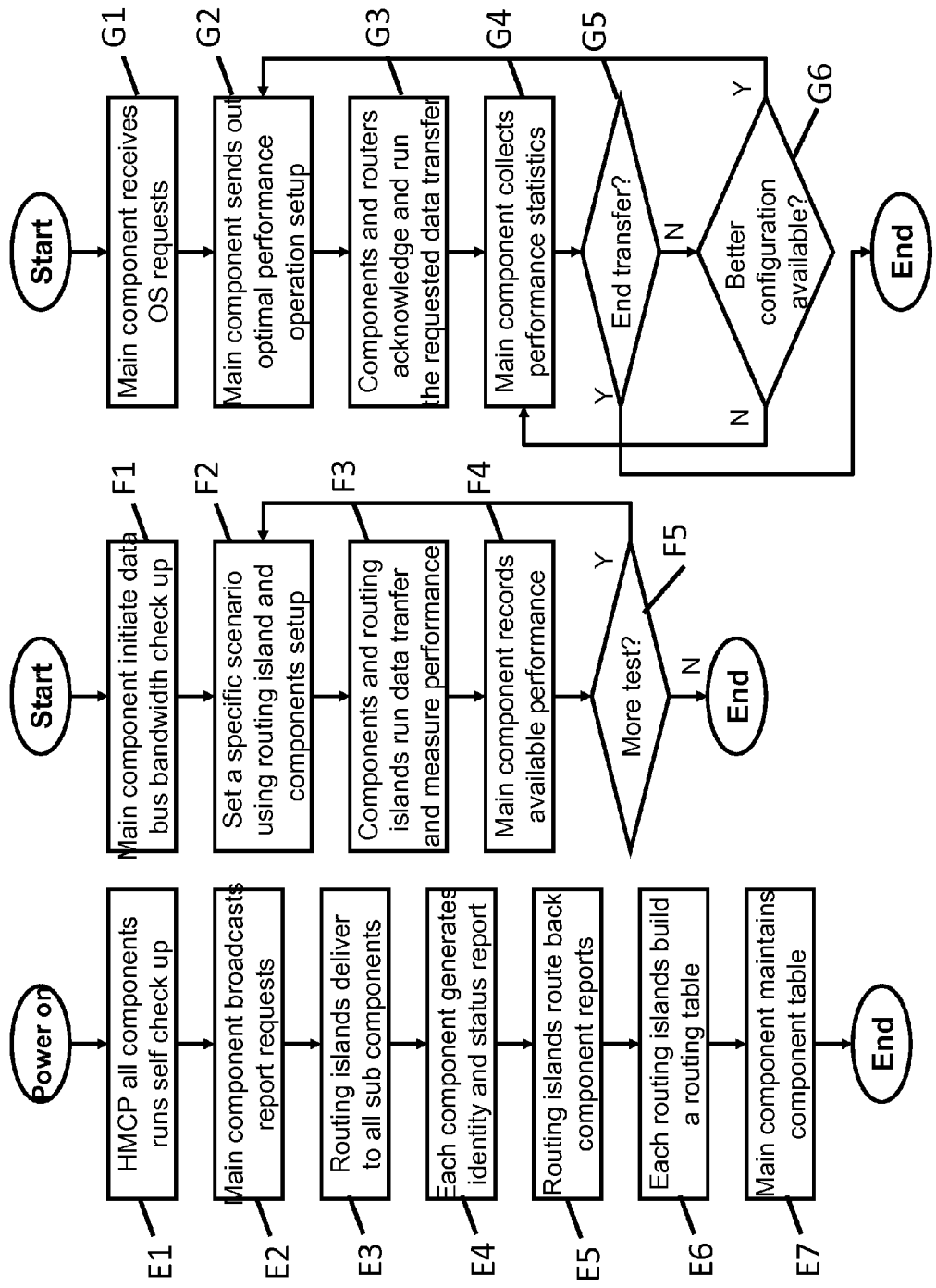

Referring to FIG. 8, a diagram of data bus routing island 14 is shown. As depicted, in use, multiple data bus routing islands 14A-C can be implemented. Connected thereto can be component cores 20A-E, component cache memory 32, and/or component I/O memory 34. Some of the functions of data bus routing island are summarized below:

Non-sequential/Sequential burst modes
Self routing table and network node report at power up
Component identification and register method FIG. 9 depicts a further view of data bus routing island 14, which can include various buffers, input/outputs, registers, controls, etc. Some of additional functions of data bus routing island are summarized below:

N-to-N routing: multiple input/output data bus connections
Internal blocks
  Input receiver(s), output driver(s), buffer memory, configuration register, controller
Configuration register
  Keeps operation mode, connected node, routing information
Traffic control
  Assign per-peer bandwidth
  Request traffic increment/decrement to service nodes
  Reports traffic status to master node
  Packet broadcasting
  Priority-based signal routing
Non-sequential/sequential burst modes
  Non-sequential mode: each packet is routed based on the packet header information
  Sequential mode: dedicated routing path for sustained time and # of packets
Component identification and register method
  Main HMFCS component broadcast request reports
  Routing island distributes requests
  Each component reports its identity, status, capacity to main HMFCS component
    Data bus, routing island, computing component, cache memory component, etc.
  Routing island relays reports to main component
  Main component registers all sub components
  Main component maintains routing map, component configuration table
  Main component runs a pseudo bandwidth check on selected component and paths
  Main component keeps the available bandwidth, conflicts, etc.
  Main component keeps all the routing island configurations
  Main component requests specific routing plan to islands for better operating efficiency
  Main component operation is tuned in HW and O/S level FIGS. 10A-C depict various methods under the present invention. In step E1 of FIG. 10A, all components run self check up. In step E2, the main component broadcasts report requests. In step E3, data bus routing islands deliver to all sub components. In step E4, each component generates identity and status report. In step E5, data bus routing islands route back component reports. In step E6, each data bus routing island build a routing table. In step E7, the main component maintains the component table.

In step F1 of FIG. 10B, the main component initiates data bus bandwidth check up. In step F2, a specific scenario is set up using the data bus routing island and components setup features. In step F3, components and routing islands run data transfers and measure performances. In step F4, the main component records available performance. In step F5, it is determined whether more tests are needed. If so, the process repeats starting with step F2. If not, the process ends.

Referring to FIG. 10C, in step G1 the main component receives OS requests. In step G2, the main component sends out optimal performance operation setup. In step g3 components and routers acknowledge and run the requested data transfers. In step G4, the main component collects performance statistics. In step G5, it is determined whether the transfer has ended. If so the process can end. If not, it is determined whether a better configuration is available in step G6. If not, the process repeats beginning with step G4. If a better configuration is available, the process will repeat beginning with step G2.

II. Examples/Implementations

FIGS. 11-14 depict various examples/implementations of the present invention. Referring first to FIG. 11, a standard-based implementation is shown. As depicted, component types 16AS-C are encapsulated within component interface encapsulations 26A-C, which themselves are coupled to unified data bus architecture 12.

For this case
        The number of components are fixed and known to the main component
        All the data bus and component architectures are known to main component
        Memory configuration is fixed
    Encapsulation
        Different components require different encapsulations
        All I/O ports and connections are encapsulated a data bus structure and scheme
        Component integration is uniform due to encapsulation
    O/S wrapper
        Different component runs different O/S
        Each O/S is wrapped in all external I/O based on standards
        Main HMFCS O/S communicates with component O/S for a desired chip operation strategy Referring to FIG. 12, a different implementation is shown. As depicted, component memory 32 can be encapsulated by component interface encapsulation 26D, which itself is coupled to unified data bus architecture 12 via data bus packet translator 24D. Further operating system 16C is wrapped by operating system wrapper 18C, which is contained in component 20C, which is encapsulated by component interface encapsulation 26C. Also, component 20C is coupled to OS packet translator 22C, which is coupled to data bus packet translator 24C, which itself is coupled to unified data bus architecture 12.

As further shown, operating systems 16A-B are wrapped by operating system wrappers 18A-B, which are contained in components 20A-B, which are encapsulated by component interface encapsulations 26A-B. Also, components 20A-B are coupled to OS packet translators 22A-B, which is coupled to data bus packet translators 24A-B, which themselves are coupled to unified data bus architecture 12 via data bus routing islands 14A-B.

For this case
        The number of components may not be known to the main component
        All the data bus and component architectures may not be known to main component
        Memory configuration is dynamic
    Component encapsulation
    O/S wrapper
    Unified data bus architecture
    Data bus & O/S packet translator
    Data bus routing island Referring to FIG. 13, a different implementation is shown. As depicted, component memory 32, can be encapsulated by component interface encapsulation 26D, which itself is coupled to unified data bus architecture 12 via data bus packet translator 24D. Further operating system 16C is wrapped by operating system wrapper 18C, which is contained in component 20C, which is encapsulated by component interface encapsulation 26C. Also, component 20C is coupled to data bus packet translator 24C, which itself is coupled to unified data bus architecture 12.

As further shown, operating systems 16A-B are wrapped by operating system wrappers 18A-B, which are contained in components 20A-B, which are encapsulated by component interface encapsulations 26A-B. Also, components 20A-B are coupled data bus packet translators 24A-B, which themselves are coupled to unified data bus architecture 12. On opposing ends of unified data bus architecture 12, are data bus routing islands 14A-B.

For this case:
    System-on-Board
    Encapsulation with additional chipset
    O/S wrapper
    Data bus packet translator
    Data ports at the boundary of the board Referring now to FIG. 14, still another implementation is shown. As depicted, component memory 32 is directly coupled to unified data bus architecture 12. In addition, operating systems 16A-C are wrapped by operating system wrappers 18A-C, which are contained in components 20A-C, which themselves are coupled to unified data bus architecture 12. On a single end of unified data bus architecture 12, is data bus routing islands 14

For this case:
    System-in-Package (SiP) case—miniature package-like board
    No room for HW encapsulation—no unified data bus
    O/S wrapper for component control
    Router per a SiP III. Computerized Implementation While shown and described herein as a hybrid multi-function component system, it is understood that the invention further provides various alternative embodiments. For example, in one embodiment, the invention provides a computer-readable/useable medium that includes computer program code to enable a computer infrastructure to provide content filtration in a VU. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 and/or storage system 116, e.g., a fixed disk, a read-only memory, a random access memory, a cache memory, etc.

In another embodiment, the invention provides a method that performs the process of the invention on a subscription, advertising, and/or fee basis. That is, a service provider, such as a Solution Integrator, could offer to provide a hybrid multi-function component system. In this case, the service provider can create, maintain, and support, etc., a computer infrastructure, such as computer infrastructure 102 that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing a hybrid multi-function component system. In this case, a computer infrastructure, such as computer infrastructure 102, can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as content filtration utility 53, from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing a program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A hybrid multi-function component system, comprising:
   an operating system wrapper wrapping an operating system, wherein the operating system wrapper is configured to provide an interface to control a component, the component wrapping the operating system wrapper;
   a unified data bus architecture having a data bus routing island, the unified data bus architecture being coupled to a data bus packet translator, wherein the data bus routing island is configured to separate and control data;
   an operating system packet translator coupled to the data bus packet translator and the operating system wrapper; and a component interface encapsulation encapsulating the component, the operating system wrapper and the operating system packet translator, wherein the component interface encapsulation is configured to provide a hardware interconnect among the component, the operating system wrapper and the operating system packet translator.

2. The hybrid multi-function component system of claim 1, the component interface encapsulation being configured to cause core components function similar to external entities.

3. The hybrid multi-function component system of claim 1, the component interface encapsulation being configured to provide standard-based hardware interconnects and power grid.

4. The hybrid multi-function component system of claim 1, the operating system wrapper being configured to provide standard-based software interfaces.

5. The hybrid multi-function component system of claim 1, the operating system wrapper being configured to provide program loading, program control, load balancing, and component operating system status.

6. The hybrid multi-function component system of claim 1, the unified data bus architecture being configured to provide deployment for component input/outputs.

7. The hybrid multi-function component system of claim 1, the unified data bus architecture comprising multiple buses for increased bandwidth.

8. The hybrid multi-function component system of claim 1, the data bus packet translator being configured to translate all input/output data communicated within the hybrid multi-function component system.

9. The hybrid multi-function component system of claim 1, the unified data bus routing island having non-sequential and sequential burst modes.

10. The hybrid multi-function component system of claim 1, the unified data bus routing island being configured to:
    cause component identification and registration;
    provide multiple input/output data bus connections; and
    provide traffic control within the hybrid multi-function component system.

11. A method for forming a hybrid multi-function component system, comprising:
    wrapping an operating system with an operating system wrapper wrapping, wherein the operating system wrapper is configured to provide an interface to control a component;
    providing a unified data bus architecture having a data bus routing island, wherein the data bus routing island is configured to separate and control data;
    coupling the unified data bus architecture to a data bus packet translator;
    coupling an operating system packet translator to the data bus packet translator and the operating system wrapper; and
    encapsulating the operating system wrapper and the operating system packet translator with a component interface encapsulation to provide a hardware interconnect among the component, the operating system wrapper and the operating system packet translator, thereby forming the hybrid multi-function component system.

12. The method of claim 11, further comprising cause core components function similar to external entities with the component interface encapsulation.

13. The method of claim 11, further comprising providing standard-based hardware interconnects and power grid with the component interface encapsulation.

14. The method of claim 11, further comprising:
    providing standard-based software interfaces with the operating system wrapper; and
    providing program loading, program control, load balancing, and component operating system status with the operating system wrapper.

15. The method of claim 11, further comprising providing deployment for component input/outputs with the unified data bus architecture.

16. The method of claim 11, the unified data bus architecture comprising multiple buses for increased bandwidth.

17. The method of claim 11, further comprising translating all input/output data communicated within the hybrid multi-function component system with the data bus packet translator.

18. The method of claim 11, the unified data bus routing island having non-sequential and sequential burst modes.

19. The method of claim 11, the unified data bus routing island:
- causing component identification and registration;
- providing multiple input/output data bus connections; and
- providing traffic control within the hybrid multi-function component system.

20. A method for deploying a hybrid multi-function component system, comprising:
providing a computer infrastructure being operable to:
- wrap an operating system with an operating system wrapper wrapping, wherein the operating system wrapper is configured to provide an interface to control a component;
- provide a unified data bus architecture having a data bus routing island, wherein the data bus routing island is configured to separate and control data;
- couple the unified data bus architecture to a data bus packet translator;
- couple an operating system packet translator to the data bus packet translator and the operating system wrapper; and
- encapsulate the operating system wrapper and the operating system packet translator with a component interface encapsulation to provide a hardware interconnect among the component, the operating system wrapper and the operating system packet translator, thereby forming the hybrid multi-function component system.

* * * * *